Aug. 20, 1957   W. L. KAUFFMAN II   2,803,142
FRICTION ROLL DRUM SUPPORT AND DRIVE
Filed Jan. 15, 1954   3 Sheets-Sheet 1

INVENTOR
Walter L. Kauffman II
BY Ralph Hammar
ATTORNEY

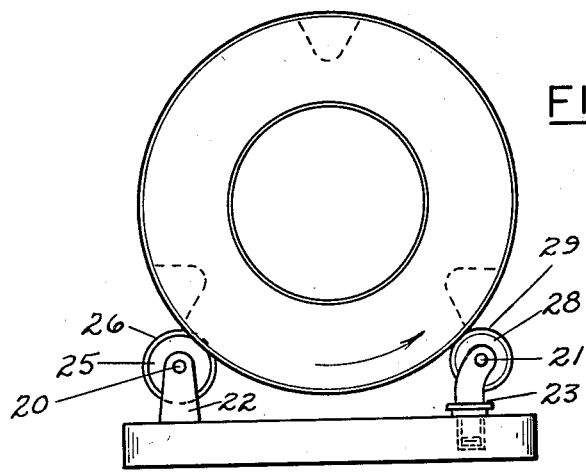
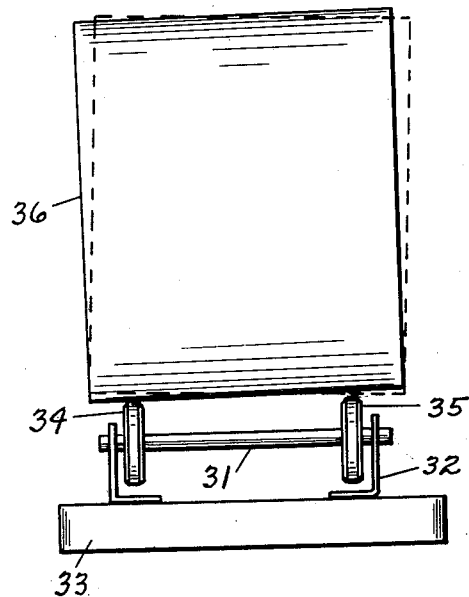

Aug. 20, 1957 W. L. KAUFFMAN II 2,803,142
FRICTION ROLL DRUM SUPPORT AND DRIVE
Filed Jan. 15, 1954 3 Sheets-Sheet 3

INVENTOR
Walter L. Kauffman II
BY Ralph Hammar
ATTORNEY

United States Patent Office 2,803,142
Patented Aug. 20, 1957

2,803,142

FRICTION ROLL DRUM SUPPORT AND DRIVE

Walter L. Kauffman II, Erie, Pa., assignor to Lovell Manufacturing Company, Erie, Pa., a corporation of Pennsylvania Application January 15, 1954, Serial No. 404,181

2 Claims. (Cl. 74—206)

In clothes dryers of the type having the periphery of the drum cradled on two pairs of pulleys at each side of the axis of rotation of the drum there is an objectionable rumbling noise which is almost impossible to eliminate. The normal variations in dimensions and distortion of the cradle or drum arising during manufacture or shipping or by reason of uneven floors results in a clearance between the periphery of the drum and one of the pulleys. Under this condition the drum rocks back and forth under the forces exerted by the tumbling clothes, the clearance appearing first at one and then at another of the pulleys and the subsequent impact of the drum against the pulley momentarily out of contact with the drum causes the objectionable noise. There is also a tendency for misalignment of the pulleys relative to the drum which causes excessive wear on the friction surfaces of the pulleys.

This invention eliminates the noise by eliminating one of the pulleys so the drum is cradled on three instead of on four pulleys. The three-pulley cradle support eliminates all clearance between the drum and the pulleys, whether caused by unevenness of the floor, eccentricity of the drum, or any other cause and entirely eliminates the rumbling noise so objectionable in the four-pulley support. The three pulley support will be quiet even if the drum is out of round or the dryer base is distorted by resting on an uneven floor or by strains occurring during shipping. This invention also eliminates the wear on the pulley surface by castering the idler pulleys so the pulleys can track on the drum surface.

Figure 1:
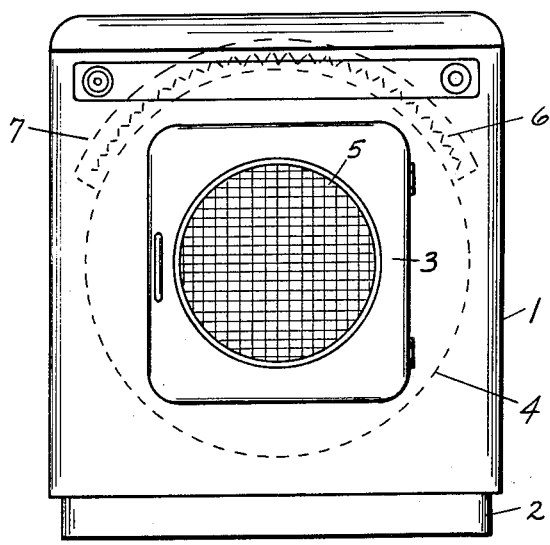
Figure 2:
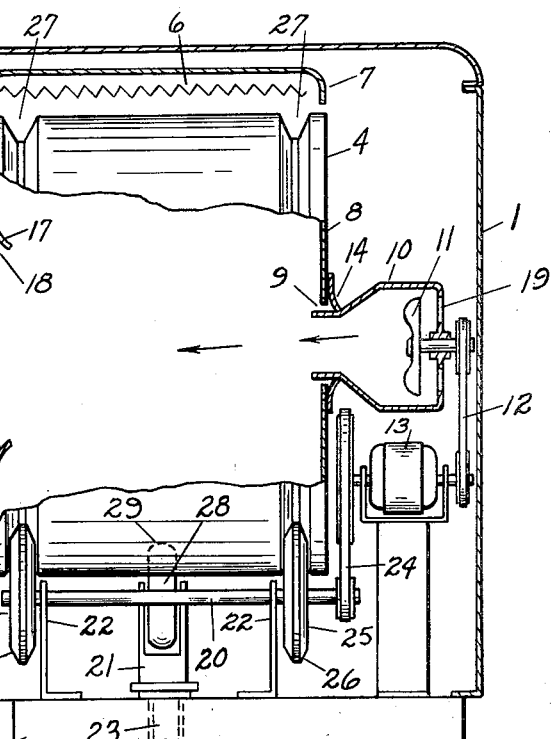
Figure 5:
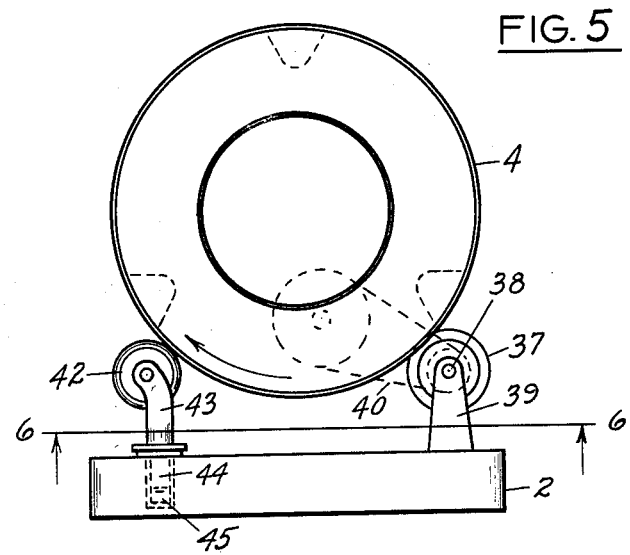
Figure 6:
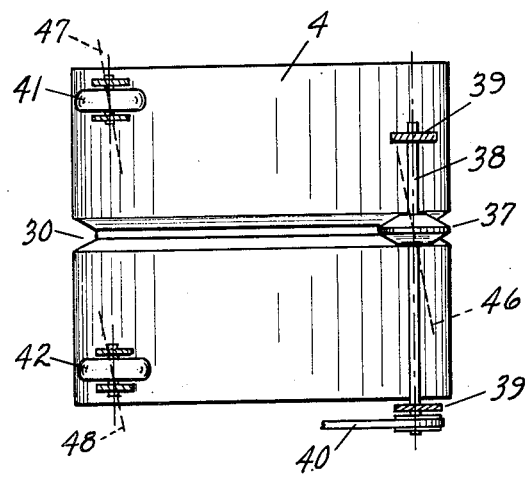

In the accompanying drawing, Fig. 1 is a front view of a dryer; Fig. 2 is a sectional side elevation; Fig. 3 is and end view of the cradle drum support using a single castered idler wheel; Fig. 4 is a diagrammatic view illustrating the source of noise in a four-pulley drum support; Fig. 5 is an end view of a three-roll support in which two idler wheels are castered to accommodate skew of the axis of rotation of the drum; and Fig. 6 is a section on line 6—6 of Fig. 5 showing the position of the castered idler wheels upon extreme misalignment of the axis of rotation of this drum.

The dryer is enclosed in a cabinet 1 resting on a base 2 and having a hinged door 3 at the front through which clothes are loaded and unloaded from a horizontal drum 4. The door has a screen 5 which filters air discharged out the front of the drum and keeps the lint from being discharged into the room. Heat for evaporating moisture in the clothes is supplied by a heating element 6 arranged between a reflector 7 and the upper periphery of the drum. With this heating arrangement, heat is radiated to the outer periphery of the drum and is transferred to the clothes by conduction, convection and radiation from the inner surface of the drum. In the back wall 8 of the drum is a central opening 9 through which extends a duct 10 forming a casing for a fan or blower 11 driven by belt 12 from a motor 13. A flexible seal 14 carried by the drum rides on the outer surface of the duct 10. In the front wall 15 of the drum is an opening 16 surrounding the screen 5. A flexible seal 17 carried by the front wall of the drum rides on a surface 18 on the door and prevents leakage of air back into the cabinet. The seals 14 and 17 are desirable to prevent the leakage of lint into the cabinet outside the drum. During operation of the blower, air is drawn from the inside of the cabinet into inlet openings 19 and is discharged axially across the drum out through the screen 5. The air within the cabinet is to some extent preheated by radiation and convection from the reflector 7 and from the outer surface of the drum and this preheated air discharged across the drum assists in evaporating moisture from the clothes. The parts so far described are or may be of common construction.

On one side of the center of rotation of the drum is an axially extending shaft 20 carried by brackets 22 on the base 2 and driven by a belt 24 from the motor 13. The shaft has two pulleys 25 each of which is provided with a rubber facing 26 engaging grooves 27 respectively at the front and at the back of the drum. One of the pulleys is fixed to the shaft so as to locate the drum and the other is loose on the shaft so it can accommodate variations in the distance between the grooves 27 and in the drum diameter. The rubber facing on the pulley 25, which is fixed to the shaft, provides a friction driving connection which provides the necessary speed reduction in the drum drive. At the opposite side of the drum is a single idler pulley 28 having a crowned rubber friction drive surface 29 riding on the outer surface of the drum. The pulley 28 is supported in a caster 21 having a stem 23 swiveled in the base 2. The crowning of the rubber facing 29 permits it to track on the drum surface. The three pulleys 25 and 28 provide a stable three-point support for the drum which will run quietly even though the drum is out of round or the shaft 20 is not exactly parallel to the drum axis due to variations in manufacture or to twisting of the dryer base 2 by unevenness in the supporting floor.

For quiet operation, it is important that the outer surface of the drum always be in contact with the pulleys 25 and 28. During the rotation of the drum, the clothes are continually lifted and dropped as part of the tumbling action and the tumbling clothes striking the lowermost part of the drum would produce an objectionable rumbling noise if the drum were not at all times in contact with the pulleys 25 and 28. With the three-point support provided by the pulleys 25 and 28, there is no possibility of pulleys being out of contact with the drum surface and the rumbling noise is accordingly entirely eliminated.

In Fig. 4 there is diagrammatically illustrated a condition which is invariably present when the drum is cradled on four pulleys instead of on three pulleys as illusrtated in the previously described construction. With the four-pulley cradle support, it is substantially impossible to have all four pulleys at all times in contact with the outer surface of the drum. Even though the pulley shafts are perfectly aligned and perfectly parallel to the theoretical axis of rotation of the drum, there will inevitably be variations in the drum diameter so that the drum cannot run true and maintain perfect contact with the pulleys. Furthermore, it is substantially impossible to have the four pulleys in perfect alignment and even if the pulleys leave the factory in perfect alignment, the alignment cannot be maintained during shipping or after installation upon uneven supporting floors. As a result of one or more of these conditions, one of the pulleys will always be out of contact with the outer surface of the drum as diagrammatically indicated in Fig. 4. In Fig. 4, only one of the two pulley shafts 31 is illustrated and this shaft is shown at the extreme bottom of the drum rather than to one side of the axis of rotation as would be the case in an actual construction. This distortion of the drawing is for the purpose of illustrating the action and not for the purpose of illustrating the construction. The shaft 31 is shown supported on brackets 32 on the base 33. On the shaft are pulleys 34 and 35, one at each end of the drum 36. In the full line position of the drum, the drum is in contact with the pulley 34, but is out of contact with the pulley 35. Of course, under this condition, the drum also is in contact with the two pulleys on the other pulley shaft 31 which is not shown so that there are three pulleys in contact with the outer surface of the drum and only one pulley, the pulley 35, which is out of contact with the surface of the drum. However, due to the tumbling action of the clothes, the drum will rock and will assume the position illustrated in dotted lines where it is in contact with the pulley 35 and out of contact with the pulley 34. The impact as the drum strikes the pulley 35 and takes up the clearance illustrated in the full line position produces the rumbling noise. The drum however does not remain in the dotted line position, but continually rocks back and forth taking up the clearance between the outer surface of the drum and one of the four pulleys and at the same time introducing a clearance between the outer surface of the drum and another one of the four pulleys. It is this continual rocking of the drum to successive positions where only three of the four pulleys are in contact with the outer periphery of the drum which produces the objectionable rumbling noise associated with this type of drum drive. This objectionable noise is entirely eliminated by the Fig. 1–3 construction where one of the four pulleys is eliminated and the drum is cradled on three instead of four pulleys.

In Figs. 5 and 6 is shown a modification which prevents excessive wear on the pulleys due to misalignment or skewing of the axis of rotation of the drum. In this construction, a single drive pulley 37 is fixed on a shaft 38 carried in brackets 39 on the base 2 and having a belt drive 40. The pulley 37 makes friction driving engagement with the center groove 30 in the drum. At the opposite side of the drum are two crowned idler pulleys 41 and 42, respectively, at the front and back of the drums. Each of the idler pulleys is mounted in a caster 43 having a stem 44 seated in a socket 45 in the base. If the shaft 38 should be skewed as indicated by dotted line 46, the idler pulleys 41 and 42 can swivel in the casters so the axes of the idler pulleys indicated by dotted lines 47 and 48 will be parallel to the dotted line 46. This eliminates misalignment which wears the friction driving surfaces of the pulleys 37, 41, and 42. The castering of the idler pulleys is useful in a four-pulley cradle support and is not limited to the three-pulley cradle support illustrated. The casters allow the idler pulleys to track in alignment with the motion of the drum surface so that if the drum were distorted instead of the drive shaft 38 being skewed, the casters would still prevent excessive wear on the friction surfaces of the pulleys.

What is claimed as new is:

1. In a clothes dryer, a cylindrical clothes receiving drum rotatable on a generally horizontal axis, a cradle support beneath the periphery of the drum comprising a pair of axially spaced pulleys at one side of the drum axis respectively located toward one and the other end of the drum and a single pulley at the other side of the drum axis, said pulleys engaging the periphery of the drum in supporting relation, casters supporting the pair of pulleys, and a drive to the single pulley.

2. In a clothes dryer, a cylindrical clothes receiving drum rotatable on a generally horizontal axis, a cradle support beneath the periphery of the drum comprising axially spaced driving and ildler pulley means respectively at one and the other side of the drum axis, and a caster support for the idler pulley means.

References Cited in the file of this patent

UNITED STATES PATENTS

| | | |
|---|---|---|
| 820,021 | Smith | May 8, 1906 |
| 1,203,102 | Dasher | Oct. 31, 1916 |
| 1,429,606 | Marsland | Sept. 19, 1922 |
| 1,658,530 | Kirner | Feb. 7, 1928 |
| 2,074,372 | Cunningham | Mar. 23, 1936 |
| 2,615,280 | Thelin | Oct. 28, 1952 |

FOREIGN PATENTS

| | | |
|---|---|---|
| 688,075 | Great Britain | Feb. 25, 1953 |